United States Patent Office 3,077,713
Patented Feb. 19, 1963

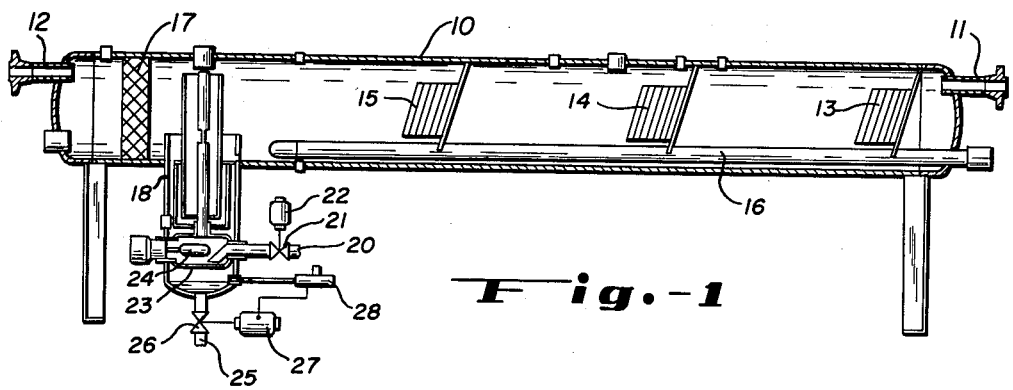

3,077,713
FLUID SEPARATING APPARATUS
Gene O. Sinex, Farmington, N. Mex., assignor to American Tank and Steel Corporation, Farmington, N. Mex., a corporation of New Mexico
Filed Oct. 31, 1960, Ser. No. 66,387
5 Claims. (Cl. 55—219)

This invention relates to gas and liquid separation apparatus such as that employed in petroleum gas treatment, and more particularly to an improved apparatus for separating two liquid components from gas and from each other. The present invention is an improvement on that disclosed and claimed in my Patent 2,899,014, issued August 11, 1959, and assigned to the same assignee.

Separating equipment such as that described in the above patent frequently is required to be operated out of doors in very cold weather where there is danger of freezing of the separated water component and resulting interruption of the normal operation of the equipment, and the invention of my aforesaid patent was directed to an arrangement for minimizing the likelihood of freezing of the separated water during cold weather. It is an object of the present invention to provide a three-phase separator for petroleum gas and the like including an improved and simplified arrangement for separating two separated liquid components and for minimizing the likelihood of freezing of water in the separator during cold weather.

Briefly, in carrying out the object of this invention in one embodiment thereof a three-phase gas and liquid separator of the horizontal drum type is provided with a liquid separation and discharge control unit including a sump casing or chamber for collecting the oil or distillate and in which is arranged an accumulator or chamber for collecting water. The water is discharged under control of a mechanism including a closed vessel arranged within the sump chamber below the accumulator and supplied with water from the accumulator, the discharge of water being controlled by a float or other suitable conventional control dependent upon the level of water in the closed vessel. The oil or distillate is discharged under an automatic control which maintains a predetermined level of the oil in the sump surrounding the accumulator and discharge vessel. Liquids are maintained warm in the separator drum and the heat of the oil in the sump prevents freezing of the water in the accumulator and in the discharge control vessel.

The features of novelty which characterize this invention are pointed out in the appended claims. The invention itself, however, both as to its organization and method of operation, together with further objects and advantages thereof, will be best understood on reference to the following description taken in connection with the accompanying drawings, in which:

FIG. 1 is a sectional elevation view of a three-phase separating apparatus embodying the invention;

FIG. 2 is an enlarged sectional elevation view of the liquid separating and discharge control unit of FIG. 1;

FIG. 3 is a sectional view along the line 3—3 of FIG. 2; and

FIG. 4 is a sectional elevation view of a modified form of the liquid separating and control unit.

Referring now to the drawings, the apparatus 30 illustrated in FIG. 1 includes a horizontal cylindrical drum 10 closed at both ends and supplied with gas to be treated through a conduit 11 and arranged to discharge the treated gas through an outlet 12. The gas admitted to the drums passes through a series of three sets of baffle plates or scrubbers 13, 14 and 15 and is heated by a gas heater 16 which may be a single U-turn burner pipe located below the normal level of liquid in the drum 10. This heater prevents the formation of hydrates or solids in the liquid. After the gas has been scrubbed it is passed through a filter 17 and discharged through the outlet 12.

Liquid removed from the gas stream collects in the bottom of the drum 10 to a level determined by the upright wall of a cylindrical sump casing 18 which depends from the left-hand lower portion of the drum and acts as a weir. The casing 18 is sealed within the drum and contains the oil and water separating and discharge equipment. Water separated from the gas is discharged through a conduit 20 by operation of a motor operated valve 21, the motor 22 of which is controlled in accordance with the level of liquid in a closed chamber 23 as determined by a float 24. Oil collected in the sump chamber 18 is discharged through a conduit 25 by operation of a valve 26 driven by a motor 27 under control of a so-called "floatless" type valve control device 28 responsive to the height of oil in the sump 18. The construction of this type of control is well known and the details have been omitted to avoid complication of the drawing.

The details of construction of the liquid separating and discharge control unit are clearly shown in FIGS. 2 and 3. As illustrated in these figures, the upper end of the wall of the cylindrical sump chamber 18 extends into the drum 10 a substantial distance and determines the height to which liquid will fill the drum as indicated by the liquid level at 30. In the drum 10 the oil or distillate and the water stratify, the oil floating on the water so that only oil overflows into the sump 18. The water filling the bottom of the drum to a level indicated at 31 lies on all sides of the casing 18 and passes through an opening 29 in the lower end of the portion of the casing wall within the drum. This water flows into an accumulating chamber 32 which is in the form of a cylindrical vessel concentric with the cylindrical chamber 18 and with its walls spaced from the walls of the chamber. Concentric with the walls of the chambers 18 and 32 there is provided an upright standpipe or column 33. This column opens into the chamber 32 in the bottom portion thereof and extends upwardly into the upper zone of the drum 10.

Immediately below the chamber 32 within the sump 18 there is located a closed vessel 34 provided with an upwardly extending sleeve or connection 35 into which is removably fitted a pipe or riser 36 extending upwardly along the central axis of the assembly; this riser is provided with openings 37 allowing discharge of liquid from within the pipe 33 and acting as a weir to determine the level at which the water or other heavy liquid will stand within the pipe. The riser 36 extends upwardly directly under a fitting 38 at the top of the drum which is provided with a removable cap 40 to afford access to the interior of the assembly and permit removal of the riser 36 for servicing or for replacement with a riser having a different elevation of the openings 37.

On either side of the pipe 33 and extending between the pipe and the upwardly extending wall of the sump 18 are provided upright baffles 41 and 42. These baffles cooperate with a closure plate 43 at the left-hand top side of the chamber 32 as viewed in FIG. 2 and a plate 44 closing the space between the chamber 32 and the wall of the sump 18 on the right-hand side of the pipe. The baffles 41 and 42 extend upwardly from the plates 43 and 44 to the height of the top wall of the casing 18. Thus oil which overflows the top wall of the casing falls into the left-hand portion of the assembly and flows down into the sump through the space between the chamber 43 and the casing walls. On the right-hand side of the pipe 33 water flows below the oil through the opening 29 and fills the chamber 32 to the level 31.

It will be noted that the portion of the upper wall of the chamber 18 extending between the baffles 41 and 42 about the closure plate 44 may be omitted since the oil will merely float on top of the water and will not tend to enter the chamber 32. Thus the arrangement of the baffles 41 and 42 serves the primary purpose of preventing the admission of water to the sump 18 and allows the water to flow only into the chamber 32.

The level of the water within the pipe 33 as determined by the height of the openings 37 is, as will be noted, above the level of the water in the drum and below the level of the oil. This higher water level results from the differential pressure on the water due to the presence of the oil in the drum, the static head of the combined layers of oil and water in the drum being balanced by the head of the water in the standpipe 33. Water which overflows into the riser 36 enters the closed vessel 34 and when a float 45 therein rises the float control indicated at 46 is actuated to energize the motor 22 and operate the valve 20 to discharge the water until the float falls and again causes the closing of valve 20. The height of the oil within the sump 18 is controlled by the valve control 28 which actuates the valve 26 by operation of the motor 27 and maintains the oil in the sump at a desired level as indicated at 50, this level being well above the float chamber 34 and sufficiently high to extend about and substantially surround the chamber 32.

The liquid in the drum 10 is maintained heated by operation of the heater 16 and thus the oil flowing into the sump 18 is heated and a layer of heated oil is maintained about the vessel 34 and chamber 32. Furthermore, the oil is a relatively poor heat conductor and minimizes the transfer of heat from the chambers 32 and 34 to the walls of the sump. For the purpose of draining and cleaning the interior of the chamber 32 there is provided a clean-out fitting 51.

Because the water separated within the drum 10 flows continually toward the chamber 32, it is maintained warm and the spacing of the chamber 32 from the exterior walls of the sump 18 facilitates retention of the heat and minimizes the likelihood of freezing of the water. This, together with the arrangement for maintaining the water in the vessel 34 in heat exchange with warm oil, assures continuous operation of the system even in very cold weather. Normally the chamber 32 will contain water to a level above the open lower end of the pipe 33 and this acts as a trap to prevent the admission of oil to the interior of the standpipe. Thus oil does not reach the chamber 34 for discharge with the water and is kept out of the water waste or discharge circuit. Thus, even though the water in the drum may not be maintained at a substanital level such as indiacted at 31, the structure is such that only water will reach the interior of the pipe 33.

In FIG. 4 there is illustrated a somewhat modified arrangement of the liquid separation and discharge control unit and the same parts have been indicated by the same numerals with the suffix "a." In this embodiment the water discharge vessel indicated at 34a is substantially larger than the vessel 34 of FIG. 2 and has its ends extending outside the sump 18. This arrangement has been found practical for installations where a larger float control assembly is required and, because a major portion of the walls of the float chamber are maintained in heat exchange with the warm oil in the sump 18, the water is kept from freezing within the float chamber. For installation in extremely cold climates, it may be desirable to provide some insulation about the outer ends of the float chamber; however, because of the heat available due to the arrangement of the major portion of the float chamber with its walls spaced from the walls of the sump, very little insulation is required for this purpose.

While the invention has been described in connection with a specific type of three-phase separator, other applications will readily be apparent to those skilled in the art. Therefore, it is not desired that the invention be limited to the details illustrated and described and it is intended by the appended claims to cover all modifications which fall within the spirit and scope of the invention.

I claim:

1. In a petroleum gas treating system or the like wherein a first liquid and a heavier second liquid are separated from a gas and are accumulated and including means for collecting the two liquids and for stratifying them by gravity, a unitary liquid separating and discharge control device comprising sump means providing a sump chamber below and in communication with the liquid collecting means, means for maintaining a predetermined maximum liquid level in the collecting means and for conducting the separated first liquid from the collecting means to said sump chamber, means providing a second chamber within said sump chamber below the collecting means, a closed vessel mounted within said sump chamber below said second chamber, means for conducting the heavier liquid from the collecting means to said second chamber, means providing communication between said second chamber and said closed vessel for maintaining a predetermined maximum level of said heavier liquid in said second chamber and for conducting the excess to said closed vessel, means dependent upon the accumulation of the heavier liquid in said closed vessel for discharging the heavier liquid therefrom and for conducting it outside said system, and means arranged to control the discharge of the first liquid from said sump means for maintaining a predetermined level of the first liquid in said sump means surrounding said vessel and extending about said second chamber.

2. In a petroleum gas treating system or the like, a unitary liquid separating and discharge control device as set forth in claim 1 wherein said means for conducting the heavier liquid to said second chamber includes an open ended pipe surrounding said communicating means between said second chamber and said closed vessel and extending from near the bottom of said second chamber into said collecting means to a zone substantially above the maximum level of liquid therein.

3. In a petroleum gas treating system or the like wherein a first liquid and a heavier second liquid are separated from a gas and are accumulated and including a drum for collecting the two liquids and for stratifying them by gravity, a unitary liquid separating and discharge control device including means providing a sump chamber depending from the drum and having an upper wall portion constituting a weir for determining the maximum liquid level within the drum, the upper end of said sump being open for receiving the overflow of lighter liquid from said drum, a second chamber arranged within said sump chamber and the upper portion thereof extending substantially below said drum, an open ended standpipe mounted in said second chamber and extending from near the bottom of said second chamber into said drum substantially above the maximum liquid level therein, a closed vessel in said sump below said second chamber, a riser providing communication between said vessel and the interior of said standpipe above said second chamber for determining the maximum level of liquid within said standpipe and for discharging the excess of liquid to said vessel, means for directing the heavier liquid from said drum into said second chamber, means dependent upon the accumulation of the heavier liquid in said vessel for discharging the heavier liquid therefrom and for conducting it outside said system, and means arranged to control the discharge of the first liquid from said sump for maintaining a predetermined level of the first liquid in said sump chamber surrounding said vessel and extending about said second chamber.

4. In a petroleum gas treating system or the like, a unitary liquid separating and discharge device as set forth in claim 3 wherein the walls of said sump chamber and said second chamber and said standpipe are cylindrical and concentric and including means for preventing the admission of said heavier liquid to said sump.

5. In a petroleum gas treating system or the like, a unitary liquid separating and discharge device as set forth in claim 4 wherein said means for preventing admission of said heavier liquid to said sump includes upright baffle plates extending between the walls of said sump and said standpipe, and closure plates extending between said baffle plates to close the space between said standpipe and the wall of said second chamber on one side of said baffle plates and the space between the wall of said sump and said second chamber on the other side of said baffle plates.

References Cited in the file of this patent
UNITED STATES PATENTS 2,899,014     Sinex _____ Aug. 11, 1959